United States Patent Office 3,221,035
Patented Nov. 30, 1965

3,221,035
REACTION PRODUCTS OF PENTAERYTHRITOL BORIC ACID AND METAL SALT
Raymond P. Silver, Kennett Square, Pa., assignor to Hercules Powder Company, Wilmington, Del., a corporation of Delaware
No Drawing. Filed Mar. 31, 1961, Ser. No. 99,699
12 Claims. (Cl. 260—429)

This invention relates to a novel composition of matter obtained by the reaction of pentaerythritol, boric acid and a divalent metal salt and to the process of preparing the same; more particularly, this invention relates to substantially water-insoluble compounds derived from the reaction between pentaerythritol, boric acid and a divalent metal salt of a weak acid in which the chemically combined molar proportions of pentaerythritol, boron and a divalent metal are approximately 1:1:0.5, and to the process for preparing the compounds.

It is known that pentaerythritol reacts with inorganic polybasic acids such as boric acid to form water-soluble complex esters. These esters have found use as plasticizers for water-soluble cellulose ethers and have been suggested as fire retardants for various materials. However, due to their water solubility, their use as fire retardants has been limited. Currently, the most successful fire-retardant paints are those that intumesce or foam on contact with heat. One known intumescent coating comprises a combination of a polyol, such as pentaerythritol, an ammonium phosphate and an amine, as well as a flame-retarding pigment. However, most such combinations have limited water resistance because of the water solubility of the polyol. Attempts to improve this defect by overcoating may result in an increase in the flame spread value.

It is an object of this invention to provide a substantially water-insoluble compound containing residues of pentaerythritol and boron which has the intumescent properties of pentaerythritol and the fire-quenching characteristics of fusible boron salts which reduce flame propagation rates by glazing over and thereby keeping air from the burning area. Research toward this objective has resulted in the finding that pentaerythritol, boric acid and a divalent metal salt of a weak acid unite chemically in the appropriate molar proportions of 1:1:0.5 to produce substantially water-insoluble, solid, amorphous compounds having intumescent and fire-retardant properties.

This invention provides novel compounds possessing a combination of properties not possessed by any hitherto known pentaerythritol—boron ester. More particularly, the compounds of the invention are powdery, free-flowing, high-melting, substantially water-insoluble, amorphous solids. Infrared spectra indicate the presence of hydroxyl groups and the absence of $>C=O$ groups. Analytical data derived from testing 18 samples of a typical compound, derived from pentaerythritol, boric acid and zinc acetate, show it to have an average analysis of about 31.3% carbon, about 5.1% hydrogen, about 17.4% zinc and about 5.7% boron. The above carbon and zinc analysis correspond almost exactly to $C_{10}ZnB_2$. It is, therefore, concluded that two pentaerythritol residues and two atoms of boron are present per atom of zinc. The same ratios are obtained when other divalent metal salts of weak acids are employed in place of the zinc salt. The exact structures of the compounds, however, is not known.

The process of the invention comprises reacting pentaerythritol, boric acid and a divalent metal salt of a weak acid. Two variations of the process have been used. In the first, the reactants are dissolved in water at any convenient temperature and, after an induction period, the compound forms as a precipitate. In the second variation, pentaerythritol and boric acid are fused in the presence of a small amount of water, a solution of the metal salt is added to the hot mixture and, after cooling, the product is collected as precipitate. Using either method, the precipitates upon analysis by infrared spectra and chemical analytical methods appear to be identical, regardless of the mole ratio of the starting materials.

As illustrations of the invention, the following examples are presented in which all parts are by weight unless otherwise specified.

*Examples 1–7*

In these examples the metal salt reactant was zinc acetate. In all cases 85 parts of a 17.7% aqueous solution (corresponding to 15 parts of zinc acetate dihydrate) was used. Predetermined amounts of pentaerythritol boric acid were dissolved in 200 parts of water in a reaction vessel and the zinc acetate solution was added. The walls of the vessel were scratched with a steel instrument and the mixtures set aside overnight before collecting the solids on a filter. An induction period of at least 1 hour was observed before any solids separated from the mixtures. After collection, the solids were dried overnight at 110° C. and analyzed. The products were white, substantially water-insoluble, amorphous solids. The analyses (corrected for moisture) are tabulated in Table I.

*Examples 8 and 9*

To a reaction vessel were added 160 parts of pentaerythritol, 74.5 parts of boric acid and 132 parts of zinc acetate dihydrate per 3000 parts of water. The mixture was stirred for 4 hours and then let stand overnight. The solids that precipitated were collected, washed with 500 parts water on a filter, dried at 110° C. in an oven for 4 hours, ground to a fine powder, and dried at 110° C. overnight. The products were white, amorphous, substantially water-insoluble solids, representing a yield of 60% and 62% of theory, based on the quantitative reaction of one mole pentaerythritol, one mole boric acid and 0.5 mole zinc acetate. The results are also tabulated in Table I.

TABLE I.—ANALYTICAL DATA ON PE, BORIC ACID, ZINC ACETATE PRODUCTS

| Examples | Ratio of ingredients, mole percent | | | Analysis of insoluble product* (Corrected for moisture), percent | | | |
|---|---|---|---|---|---|---|---|
| | PE | Boric acid | Zinc acetate | C | H | Zn | B |
| 1 | 33 | 50 | 17 | 31.78 | 5.28 | 17.4 | 6.48 |
| 2 | 33 | 37 | 30 | 31.93 | 5.20 | 17.3 | 6.78 |
| 3 | 20 | 50 | 30 | 31.38 | 5.03 | 17.7 | 6.52 |
| 4 | 20 | 62 | 18 | 31.27 | 5.06 | 17.7 | 6.76 |
| 5 | 33 | 62 | 5 | 31.98 | 5.10 | 17.6 | 6.67 |
| 6 | 45 | 37 | 18 | 31.71 | 5.20 | 17.3 | 6.53 |
| 7 | 50 | 25 | 25 | 32.37 | 5.20 | 17.4 | 4.93 |
| 8 | 40 | 40 | 20 | 31.50 | 4.99 | 16.4 | 5.16 |
| 9 | 40 | 40 | 20 | 31.90 | 5.41 | 17.4 | 4.69 |

*Variations in boron analyses attributable to poor reproducibility of method.

*Example 10*

In a reaction vessel was placed 200 parts of pentaerythritol, 91 parts of boric acid and 50 parts of water. The mixture was heated with stirring to 130° C. and then a solution of 161 parts of zinc acetate dihydrate in 500 parts of water was added. The mixture was heated with stirring to 125° C. while distillate was removed and then 500 parts of water was added. After cooling the mixture to room temperature, the solids were collected, washed with 500 parts of water and dried 48 hours at 110° C. The yield was 153 grams (54% of theory based on the reaction of 1 mole of pentaerythritol, 1 mole of boron and 0.5 mole zinc). Analysis of the white, amorphous, solid, substantially water-insoluble product (corrected for moisture) gave 17.5% zinc, 5.34% boron, 5.17% hydrogen and 31.64% carbon.

*Example 11*

Example 10 was repeated using 1500 parts of pentaerythritol, 682 parts of boric acid and 1210 parts of zinc acetate dihydrate. Analysis of the white, amorphous, solid, substantially water-insoluble product (corrected for moisture) showed 17.4% zinc, 5.55% boron, 5.19% hydrogen and 32.03% carbon. The yield was 1847 grams (85% of theory based on reaction of 1 mole of pentaerythritol, 1 mole of boron and 0.5 mole of zinc).

*Example 12*

Following the procedure described in Examples 1–7, sufficient cadmium acetate was added to a solution of 10.0 parts of pentaerythritol, 4.55 parts of boric acid and 50 parts water to make the mole ratio of pentaerythritol:boron:cadmium 1:1:0.5. Analysis of the solid, amorphous, substantially water-insoluble precipitate (corrected for moisture) showed 21.5% cadmium, 4.7% boron, 5.40% hydrogen and 28.22% carbon. The yield was 7.8 grams (65% of theory based on the reaction of 1 mole of pentaerythritol, 1 mole of boron, and 0.5 mole of cadmium).

*Example 13*

The precipitation technique described in Example 12 was repeated using copper, magnesium, calcium, manganese and cobalt acetate in place of cadmium acetate. In each experiment, a solid, substantially water-insoluble, amorphous precipitate having a pentaerythritol:boron:metal ratio of approximately 1:1:0.5 was obtained.

*Example 14*

A slightly scaled-up preparation of the pentaerythritol, boric acid, barium acetate product was carried out at a mole ratio of pentaerythritol:boron:barium of 1:1:0.5 using the precipitation technique described in Example 12. A solid, substantially water-insoluble, amorphous product having a pentaerythritol:boron:barium ratio of approximately 1:1:0.5 was obtained.

*Example 15*

The fusion technique described in Example 10 was carried out using barium and cadmium acetates in place of zinc acetate. The cadmium reaction proceeded similarly to the zinc reaction. However, with barium acetate, precipitation was slower, and it was not until the reaction mixture was allowed to stand overnight that a solid product separated from the solution. All products were amorphous, substantially water-insoluble solids having a pentaerythritol:boron:metal ratio of approximately 1:1:0.5.

As was pointed out above, the exact structure of the pentaerythritol, boron, divalent metal compound is not known. However, the analytical data show that two pentaerythritol residues are present per atom of metal and that there are two boron atoms per atom of metal. They are thus characterized as reaction products of pentaerythritol, boric acid and a divalent metal salt of a weak acid in which the chemically combined molar proportions of pentaerythritol, boron and divalent metal are approximately 1:1:0.5, and as powdery, free-flowing, high-melting, substantially water-insoluble, amorphous solids.

The metals which may be used in the preparation of the pentaerythritol, boron, divalent metal compound include any divalent metal representative of which are the following: calcium, barium, magnesium, manganese, copper, cobalt, zinc and cadmium. The weak acids which may be used to form salts with any of the metals listed above in the preparation of the pentaerythritol, boron, divalent metal compound include all weak, salt-forming acids such as acetic, propionic, butyric, valeric, trimethyl acetic, caproic, heptylic, caprylic, pelargonic, β-chloropropionic and benzoic acids. Inorganic acids such as boric acid may also be used.

In preparing the pentaerythritol, boric acid, divalent metal compounds the reactants may be used in various proportions. It is preferred to employ 0.8 to 1.2 moles pentaerythritol, 0.8 to 1.2 moles boric acid and 0.3 to 0.7 mole divalent metal salt, with 1.0 mole pentaerythritol, 1.0 mole boric acid and 0.5 mole divalent metal salt being most preferred.

In preparing the subject reaction product, various reaction temperatures can be employed, depending upon whether the precipitation technique or fusion method is employed. The preferred temperatures for the precipitation method are from 0° C. to 100° C. with temperatures of 20° C. to 30° C. being most preferred. The preferred temperatures for the fusion method are from 100° C. to 150° C. with 120° C. to 130° C. being most preferred.

The water-insoluble pentaerythritol, boron, divalent metal reaction products of the present invention are partially useful as nonresinous carbonifics in intumescent fire-retardant coating compositions.

What I claim and desire to protect by Letters Patent is:

1. A substantially water-insoluble, amorphous, solid product of the reaction, in the presence of water, of pentaerythritol, boric acid and a divalent metal salt of a weak acid, in which product the chemically combined molar proportions of pentaerythritol, boron and divalent metal are approximately 1:1:0.5, said weak acid being selected from the group consisting of acetic, propionic, butyric, valeric, trimethyl acetic, caproic, haptylic, caprylic, pelargonic, β-chloropropionic, and benzoic acids.

2. The product of claim 1 wherein the divalent metal salt is a zinc salt.

3. The product of claim 1 wherein the divalent metal salt is a copper salt.

4. The product of claim 1 wherein the divalent metal salt is a magnesium salt.

5. The product of claim 1 wherein the divalent metal salt is a calcium salt.

6. The product of claim 1 wherein the divalent metal salt is a manganese salt.

7. The product of claim 1 wherein the divalent metal salt is a barium salt.

8. The product of claim 1 wherein the divalent metal salt is a cadmium salt.

9. The product of claim 1 wherein the divalent metal salt is a cobalt salt.

10. A process for preparing a substantially water-insoluble, amorphous, solid reaction product of pentaerythritol, boric acid and a divalent metal salt of a weak acid in which the chemically combined molar proportions of pentaerythritol, boron and divalent metal are approximately 1:1:0.5, which comprises reacting pentaerythritol with boric acid and a divalent metal salt of a weak acid in the presence of water, said weak acid being selected from the group consisting of acetic, propionic, butyric, valeric, trimethyl acetic, caproic, heptylic, caprylic, pelargonic, β-chloropropionic, and benzoic acids.

11. A process for preparing a substantially water-insoluble, amorphous reaction product of pentaerythritol, boric acid and a divalent metal salt of a weak acid in which the chemically combined molar proportions of pentaerythritol, boron and divalent metal are approximately 1:1:0.5, which comprises fusing a mixture of pentaerythritol and boric acid in the presence of a small amount of water, adding a water solution of a divalent metal salt of a weak acid to the mixture, said weak acid being selected from the group consisting of acetic, propionic, butyric, valeric, trimethyl acetic, caproic, heptylic, caprlyic, pelargonic, β-chloropropionic, and benzoic acids, allowing the mixture to stand and then collecting as solids said reaction product which separates from the mixture.

12. A process for preparing a substantially water-insoluble, amorphous reaction product of pentaerythritol, boric acid and a divalent metal salt of a weak acid in which the chemically combined molar proportions of pentaerythritol, boron and divalent metal are approximately 1:1:0.5, which comprises mixing pentaerythritol, boric acid and a divalent metal salt of a weak acid in water, said weak acid being selected from the group consisting of acetic, propionic, butyric, valeric, trimethyl acetic, caproic, heptylic, caprylic, pelargonic, β-chloropropionic, and benzoic acids, allowing the mixture to stand and then collecting as solids said reaction product which separates from the mixture.

References Cited by the Examiner

UNITED STATES PATENTS

| | | | |
|---|---|---|---|
| 2,223,349 | 12/1940 | Bremer | 260—462 |
| 2,706,675 | 4/1955 | Chatelain. | |
| 2,949,439 | 8/1960 | Fuchsman et al. | 260—462 |

FOREIGN PATENTS 863,689  1/1960  Great Britain.

OTHER REFERENCES

Deutsche Chemische Gesellschaft (Berichte), Oct.–Dec. (1908), p. 3469.

TOBIAS E. LEVOW, *Primary Examiner.*